US012669174B2

(12) United States Patent
Geiser

(10) Patent No.: US 12,669,174 B2
(45) Date of Patent: Jun. 30, 2026

(54) SHIFT PLATE CONTROL PANEL FOR OFF-ROAD VEHICLE

(71) Applicant: Geiser, Inc., Phoenix, AZ (US)

(72) Inventor: Sean Geiser, Phoenix, AZ (US)

(73) Assignee: Geiser, Inc., Phoenix, AZ (US)

( * ) Notice: Subject to any disclaimer, the term of this patent is extended or adjusted under 35 U.S.C. 154(b) by 0 days.

(21) Appl. No.: 18/766,211

(22) Filed: Jul. 8, 2024

(65) Prior Publication Data

US 2025/0027560 A1     Jan. 23, 2025

Related U.S. Application Data

(60) Provisional application No. 63/513,954, filed on Jul. 17, 2023.

(51) Int. Cl.
| | |
|---|---|
| *F16H 59/02* | (2006.01) |
| *B60K 20/04* | (2006.01) |
| *B60K 35/10* | (2024.01) |
| *F16H 59/10* | (2006.01) |

(52) U.S. Cl.
CPC ......... *F16H 59/0217* (2013.01); *B60K 20/04* (2013.01); *B60K 35/10* (2024.01); *F16H 59/105* (2013.01)

(58) Field of Classification Search
CPC ..... F16H 59/0217; F16H 59/10; B60K 20/04; B60K 35/10
USPC ........................................................ D12/179
See application file for complete search history.

(56) References Cited

U.S. PATENT DOCUMENTS

| | | | | |
|---|---|---|---|---|
| 11,097,613 B2 * | 8/2021 | Hurd | ...................... | B60K 17/08 |
| 2016/0131246 A1 * | 5/2016 | Park | ...................... | F16H 59/10 |
| | | | | 74/473.12 |
| 2017/0089453 A1 * | 3/2017 | Park | ...................... | F16H 59/10 |

FOREIGN PATENT DOCUMENTS

| | | | | | |
|---|---|---|---|---|---|
| CN | 107869576 B | * | 8/2021 | ......... | F16H 59/0217 |
| DE | 102018210460 A1 | * | 8/2019 | ......... | B60R 16/0231 |
| DE | 102019213863 A1 | * | 3/2021 | | |
| JP | 2007084033 A | * | 4/2007 | ........... | B60R 16/005 |
| JP | 4103241 B2 | * | 6/2008 | | |

OTHER PUBLICATIONS

Proton X70 Brochure (Year: 2017).*
Range Rover Sport vs The Spillway YouTube Video https://www.youtube.com/watch?v=i0Z1VKWf3RM (Year: 2022).*
(Continued)

*Primary Examiner* — Bobby Rushing, Jr.
(74) *Attorney, Agent, or Firm* — Schmeiser Olsen PLLC

(57) ABSTRACT

A shift plate control panel for an off-road vehicle is provided. The shift plate control panel may include a shift plate member having a longitudinal slot configured for a shift stick to travel within during shifting. The shift plate control panel may also include a control panel with at least one control button. The control panel may be coupled to the shift plate member. Further, the control panel is configured to electrically couple to at least one vehicle system corresponding to the at least one control button. The vehicle systems may be a horn, a dome light, bumper lights, a pillar light, a pumper, headlights, a fuel tank switch, and the like. These control buttons may be customized based on the vehicle and driver preferences.

6 Claims, 3 Drawing Sheets

(56) References Cited

OTHER PUBLICATIONS

Off Roading in the G-Class—Mercedes-Benz Luxury SUV YouTube Video https://www.youtube.com/watch?v=- G-rPqtKd_I (Year: 2012).*

All-New 2025 Nissan Armada® SUV | Off-Road Performance Features YouTube Video https://www.youtube.com/watch?v= EqQGvdS8H_0 (Year: 2024).*

* cited by examiner

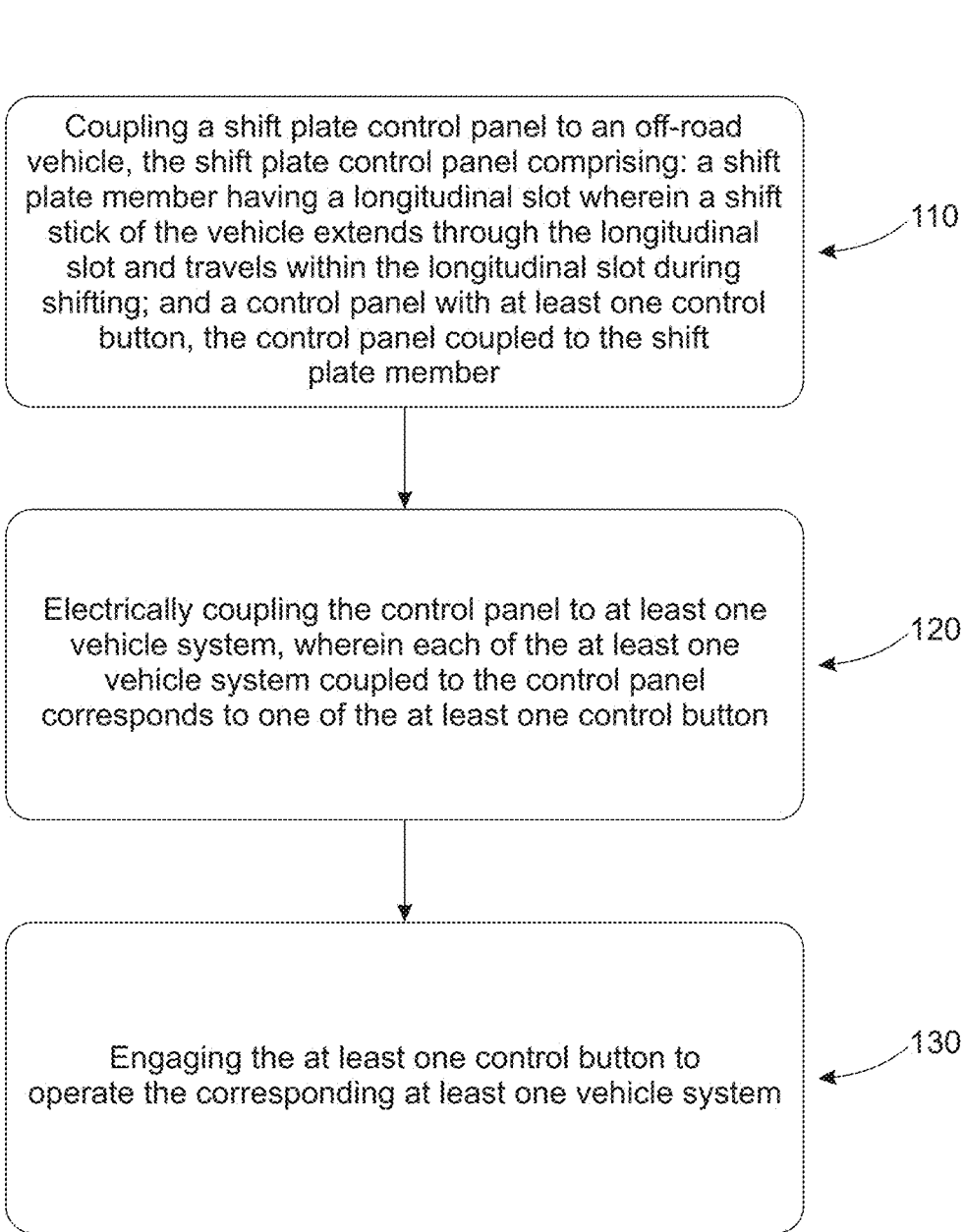

100

Coupling a shift plate control panel to an off-road vehicle, the shift plate control panel comprising: a shift plate member having a longitudinal slot wherein a shift stick of the vehicle extends through the longitudinal slot and travels within the longitudinal slot during shifting; and a control panel with at least one control button, the control panel coupled to the shift plate member

110

Electrically coupling the control panel to at least one vehicle system, wherein each of the at least one vehicle system coupled to the control panel corresponds to one of the at least one control button

120

Engaging the at least one control button to operate the corresponding at least one vehicle system

SHIFT PLATE CONTROL PANEL FOR OFF-ROAD VEHICLE

CROSS REFERENCE TO RELATED APPLICATION(S)

This application claims priority to U.S. Provisional Patent Application entitled "SHIFT PLATE CONTROL PANEL FOR OFF-ROAD VEHICLE," Ser. No. 63/513,954, filed Jul. 17, 2023, the disclosure of which is hereby incorporated entirely herein by reference.

BACKGROUND OF THE INVENTION

Technical Field

This invention relates generally to a control panel and more particularly to a shift plate control panel for an off-road vehicle.

State of the Art

Off-road vehicles include control panels that are generally located in a dash console panel of the off-road vehicles. The controls panels provide control over certain vehicle functions like various exterior and interior lights, horn, fuel tank switch, pump, and the like. This location lacks convenience, particularly when racing, operating an off-road vehicle through difficult terrain, or the like.

Accordingly, there is a need for an improved shift plate control panel for use with an off-road vehicle.

SUMMARY OF THE INVENTION

An embodiment includes a shift plate control panel for an off-road vehicle comprising: a shift plate member having a longitudinal slot configured for a shift stick to travel within during shifting; and a control panel having at least one control button, the control panel coupled to the shift plate member, wherein the control panel is configured to electrically couple to at least one vehicle system corresponding to the at least one control button.

The at least one control button may be a plurality of control buttons and each of the at least one vehicle system may correspond to one of the plurality of control buttons. The plurality of control buttons may be arranged along one side of the longitudinal slot. The plurality of control buttons may be arranged in a linear manner in rows and columns on the control panel. A plurality of shift points may be arranged on an opposite side of the longitudinal slot within the shift plate member. The at least one vehicle system may be selected from a group consisting of a horn, a dome light, bumper lights, a pillar light, a pumper, headlights, and/or a fuel tank switch. The control panel may be located on a passenger side of the shift stick.

Another embodiment includes a method of using a shift plate control panel with an off-road vehicle, the method comprising: coupling a shift plate control panel to an off-road vehicle, the shift plate control panel comprising: a shift plate member having a longitudinal slot wherein a shift stick of the vehicle extends through the longitudinal slot and travels within the longitudinal slot during shifting; and a control panel with at least one control button, the control panel coupled to the shift plate member; electrically coupling the control panel to at least one vehicle system, wherein each of the at least one vehicle system coupled to the control panel corresponds to one of the at least one control button; and engaging the at least one control button to operate the corresponding at least one vehicle system.

The at least one control button may be plurality of control buttons and each of the at least one vehicle system may correspond to one of the plurality of control buttons. The method may further comprise arranging the plurality of control buttons along one side of the longitudinal slot. The method may further comprise arranging the plurality of control buttons in a linear manner in rows and columns on the control panel. The method may further comprise arranging a plurality of shift points on an opposite side of the longitudinal slot within the shift plate member. The method may further comprise selecting the at least one vehicle system from a group consisting of a horn, a dome light, bumper lights, a pillar light, a pumper, headlights, and/or a fuel tank switch. The method may further comprise locating the control panel on a passenger side of the shift stick.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 is a block diagram of steps of a method of using a shift plate control panel with an off-road vehicle, according to an embodiment.

DETAILED DESCRIPTION OF EMBODIMENTS OF THE INVENTION

As discussed above, embodiments of the present invention relate to a shift plate control panel for an off-road vehicle.

Figure 1:
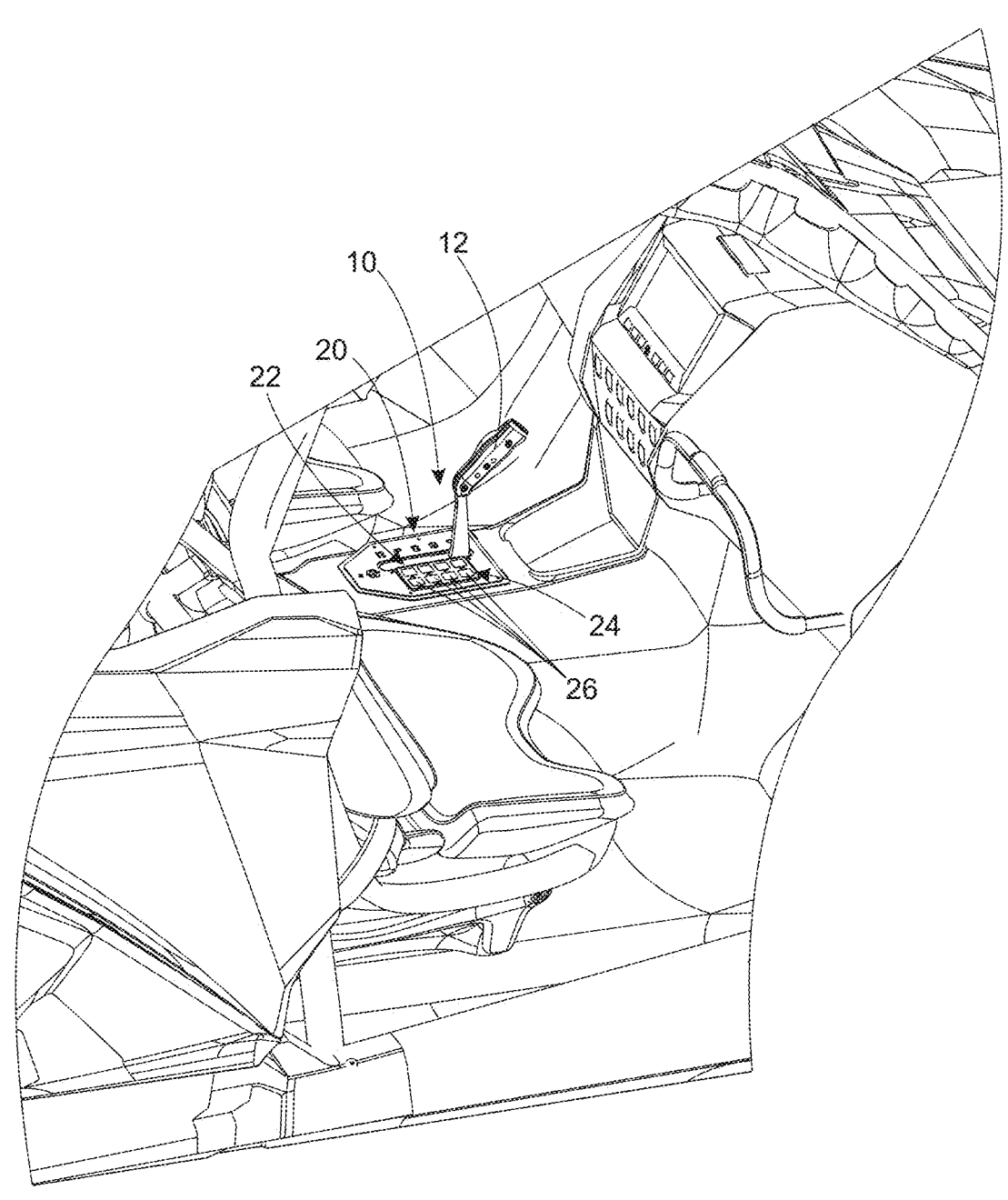
FIG. 1 is a perspective view of a shift plate control panel for an off-road vehicle, according to an embodiment.
Figure 2:
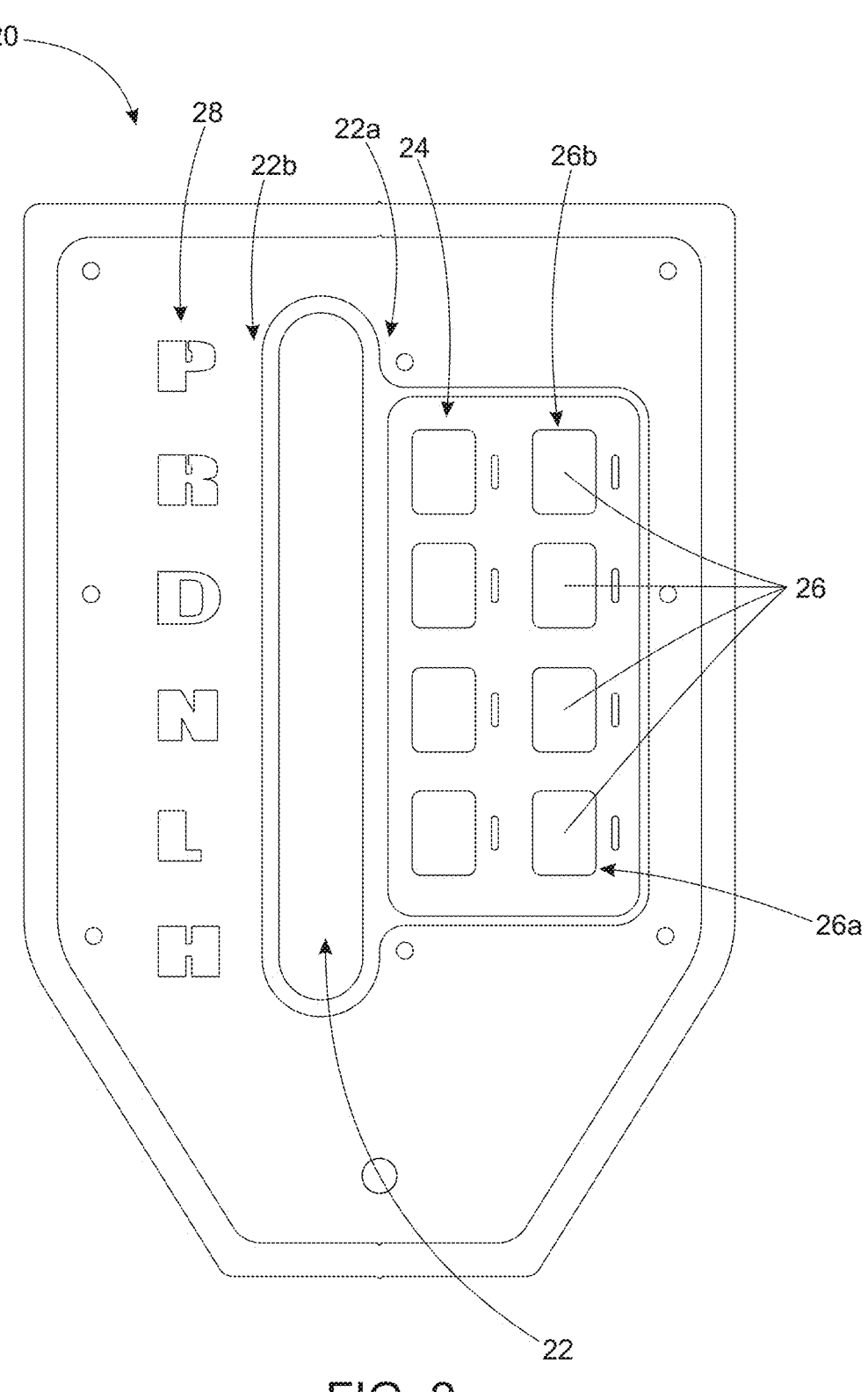
FIG. 2 is another perspective view of a shift plate control panel for an off-road vehicle, according to an embodiment.

Referring to FIGS. 1 and 2, an embodiment of a shift plate control panel 10 is shown. The shift plate control panel 10 may comprise a shift plate member 20 having a longitudinal slot 22 configured for a shift stick 12 to travel within during shifting. Further, the shift plate control panel 10 may comprise a control panel 24 with at least one control button (a plurality of control buttons) 26.

The plurality of control buttons 26 is arranged along one side 22a of the longitudinal slot 22. The plurality of control buttons 26 is arranged in a linear manner along the one side 22a of the longitudinal slot 22. The plurality of control buttons 26 is arranged in rows 26a and columns 26b on the control panel 24. In another embodiment, the plurality of control buttons 26 may be arranged in various patterns (not shown) on the control panel 24 including diagonal, cross-shaped, elliptical, circular, and the like.

A plurality of shift points 28 (P-park, R-reverse, N-neutral, D-drive, L-low, and/or H-high) may be indicated on an opposite side 22b of the longitudinal slot 22 within the shift plate member 20. The plurality of control buttons 26 may be switched (not shown) in position about the longitudinal slot 22 with the plurality of shift points 28.

The control panel 24 may be coupled to the shift plate member 20 to form an integrated component of the shift plate member 20 and the control panel 24. The control panel 24 is configured to electrically couple to at least one vehicle system corresponding to the plurality of control buttons 26. For example, and without limitation, the at least one vehicle system may be a horn, a dome light, bumper lights, a pillar light, a pumper, headlights, a fuel tank switch, and the like. These plurality of control buttons 26 may be customized based on the vehicle and driver preferences.

In operation, the shift plate control panel 10 may be coupled to an off-road vehicle. In doing so, the shift plate member 20 having the longitudinal slot 22 may be coupled to a center console area wherein the shift stick 12 of the vehicle extends through the longitudinal slot 22 and travels within the longitudinal slot 22 during shifting. Control panel 24 with the plurality of control buttons 26 is coupled to the shift plate member 20 and in embodiments may be located on the passenger side of the shift stick 12. The control panel 24 may be electrically coupled to the at least one vehicle system. Each vehicle system coupled to the control panel corresponds to one of the plurality of control buttons 26. The driver or passenger of the off-road vehicle may then engage one of the plurality of control buttons 26 to operate the corresponding vehicle system.

FIG. 3 shows a method of using a shift plate control panel with an off-road vehicle. Method 100 comprises: coupling a shift plate control panel to an off-road vehicle, the shift plate control panel comprising: a shift plate member having a longitudinal slot wherein a shift stick of the vehicle extends through the longitudinal slot and travels within the longitudinal slot during shifting; and a control panel with at least one control button, the control panel coupled to the shift plate member (Step 110); electrically coupling the control panel to at least one vehicle system, wherein each of the at least one vehicle system coupled to the control panel corresponds to one of the at least one control button (Step 120); and engaging the at least one control button to operate the corresponding at least one vehicle system (Step 130).

The at least one control button is a plurality of control buttons and wherein each of the at least one vehicle system corresponds to one of the plurality of control buttons. The method further comprises arranging the plurality of control buttons along one side of the longitudinal slot. The method further comprises arranging the plurality of control buttons in a linear manner in rows and columns on the control panel. The method further comprises arranging a plurality of shift points on an opposite side of the longitudinal slot within the shift plate member. The method further comprises selecting the at least one vehicle system from a group consisting of a horn, a dome light, bumper lights, a pillar light, a pumper, headlights, and/or a fuel tank switch. The method further comprises locating the control panel on a passenger side of the shift stick.

It will be understood that implementations are not limited to the specific components disclosed herein, as virtually any components consistent with the intended operation of a method and/or system implementation for a shift plate control panel may be utilized. Accordingly, for example, although particular shift plate members, control panels, control buttons, and other components are disclosed, such components may comprise any shape, size, style, type, model, version, class, grade, measurement, concentration, material, weight, quantity, and/or the like consistent with the intended operation of a method and/or system implementation for a shift plate control panel. Implementations are not limited to uses of any specific components, provided that the components selected are consistent with the intended operation of a method and/or system implementation for a shift plate control panel.

Accordingly, the components defining any shift plate control panel implementation may be formed of any of many different types of materials or combinations thereof that can readily be formed into shaped objects provided that the components selected are consistent with the intended operation of a shift plate control panel implementation. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any shift plate control panel implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A shift plate control panel for an off-road vehicle comprising:
   a shift plate member having a longitudinal slot configured for a shift stick to travel within during shifting;
   at least one vehicle system; and
   a control panel having at least one control button, the control panel coupled to the shift plate member, wherein the control panel electrically couples to the at least one vehicle system corresponding to the at least one control button, wherein the at least one vehicle system is selected from a group consisting of a horn, a dome light, bumper lights, a pillar light, a pumper, headlights, and/or a fuel tank switch, wherein the shift plate control panel is operational during operation of the off-road vehicle, wherein the operation of the off-road vehicle comprises driving of the off-road vehicle, wherein the at least one control button is a plurality of control buttons, wherein each of the at least one vehicle system corresponds to one of the plurality of control buttons, wherein the plurality of control buttons is arranged along one side of the longitudinal slot, wherein the plurality of control buttons is arranged and aligned in a linear manner in both horizontal rows and vertical columns on the control panel along the one side of the longitudinal slot in at least a pair of vertically arranged columns, wherein a plurality of shift points is arranged on an opposite side of the longitudinal slot within the shift plate member in at least one vertically arranged column, and wherein the plurality of shift points is aligned in the at least one vertically arranged column along the opposite side of the longitudinal slot in a parallel relationship to the longitudinal slot and to the at least a pair of vertically arranged columns of the plurality of control buttons.

2. The shift plate control panel of claim 1, wherein the control panel is located on a passenger side of the shift stick and configured to be operated by a passenger.

3. The shift plate control panel of claim 1, wherein the operation of the off-road vehicle further comprises racing of the off-road vehicle.

4. A method of using a shift plate control panel with an off-road vehicle, the method comprising:

coupling a shift plate control panel to an off-road vehicle, the shift plate control panel comprising:

a shift plate member having a longitudinal slot wherein a shift stick of the vehicle extends through the longitudinal slot and travels within the longitudinal slot during shifting; and a control panel with at least one control button, the control panel coupled to the shift plate member;

electrically coupling the control panel to at least one vehicle system, wherein each of the at least one vehicle system coupled to the control panel corresponds to one of the at least one control button;

selecting the at least one vehicle system from a group consisting of a horn, a dome light, bumper lights, a pillar light, a pumper, headlights, and/or a fuel tank switch; and engaging the at least one control button to operate the corresponding at least one vehicle system, wherein the engaging of the at least one control button to operate the corresponding at least one vehicle system is during operation of the off-road vehicle, wherein the operation of the off-road vehicle comprises driving of the off-road vehicle, wherein the at least one control button is a plurality of control buttons, wherein each of the at least one vehicle system corresponds to one of the plurality of control buttons, wherein the plurality of control buttons is arranged along one side of the longitudinal slot, wherein the plurality of control buttons is arranged and aligned in a linear manner in both horizontal rows and vertical columns on the control panel along the one side of the longitudinal slot in at least a pair of vertically arranged columns, wherein a plurality of shift points is arranged on an opposite side of the longitudinal slot within the shift plate member in at least one vertically arranged column, and wherein the plurality of shift points is aligned in the at least one vertically arranged column along the opposite side of the longitudinal slot in a parallel relationship to the longitudinal slot and to the at least a pair of vertically arranged columns of the plurality of control buttons.

5. The method of claim 4, further comprising locating the control panel on a passenger side of the shift stick and operating by a passenger.

6. The method of claim 4, wherein the operation of the off-road vehicle further comprises racing of the off-road vehicle.

* * * * *